United States Patent [19]

Havens

[11] Patent Number: 5,001,015
[45] Date of Patent: Mar. 19, 1991

[54] ANTISTATIC POLYOLEFIN COMPOSITIONS AND ANTISTATIC POLYOLEFIN FILMS MADE THEREFROM, INCLUDING ORIENTED FILMS

[75] Inventor: Marvin R. Havens, Greer, S.C.

[73] Assignee: W. R. Grace & Co.-Conn., Duncan, S.C.

[21] Appl. No.: 468,453

[22] Filed: Jan. 22, 1990

Related U.S. Application Data

[63] Continuation of Ser. No. 162,718, Mar. 1, 1988, abandoned, which is a continuation-in-part of Ser. No. 918,754, Oct. 14, 1986, Pat. No. 4,800,115.

[51] Int. Cl.$^5$ ............................................... B32B 5/10
[52] U.S. Cl. ................................... 428/516; 428/910; 524/317; 270/52
[58] Field of Search ............................. 428/910, 516

[56] References Cited

U.S. PATENT DOCUMENTS

| | | |
|---|---|---|
| 3,022,543 | 2/1962 | Baird, Jr. et al. . |
| 3,164,481 | 1/1965 | Shibe . |
| 3,220,985 | 11/1965 | Breslow . |
| 3,425,981 | 2/1969 | Puletti et al. . |
| 3,441,552 | 4/1969 | Rombusch et al. . |
| 3,576,649 | 4/1971 | Brazier . |
| 3,741,253 | 6/1973 | Brax et al. . |
| 3,821,182 | 6/1974 | Baird, Jr. et al. . |
| 4,048,428 | 7/1979 | Baird, Jr. et al. . |
| 4,117,193 | 9/1979 | Tsuchiya et al. . |
| 4,188,443 | 2/1980 | Mueller et al. . |
| 4,194,039 | 3/1980 | Mueller . |
| 4,229,241 | 10/1980 | Mueller . |
| 4,268,583 | 5/1981 | Hendy . |
| 4,274,900 | 6/1981 | Mueller et al. . |
| 4,494,651 | 1/1985 | Malcolm . |
| 4,554,210 | 11/1985 | Long et al. . |
| 4,576,669 | 1/1986 | Caputo . |
| 4,579,516 | 1/1986 | Caputo . |
| 4,600,743 | 7/1986 | Shizuki et al. . |

FOREIGN PATENT DOCUMENTS

| | | |
|---|---|---|
| 208578 | 6/1957 | Australia . |
| 176128 | 7/1976 | New Zealand . |
| 191179 | 2/1981 | New Zealand . |
| 189905 | 12/1982 | New Zealand . |
| 2015426 | 9/1979 | United Kingdom . |

OTHER PUBLICATIONS

Federal Test Method Standard 101C, Method 4046.1, "Electrostatic Properties of Materials".
ICI Americas, Inc., ATMER ® 129.
"Computer Analysis of Static Decay Curves" Fowler, Lovin, and Carson, vol. 3, No. 3 published in Sep. of 1987 in EOS/ESD magazine Threshhold.

Primary Examiner—P. C. Sluby
Attorney, Agent, or Firm—John J. Toney; Jennifer L. Skord; William D. Lee, Jr.

[57] ABSTRACT

Disclosed is a film having antistatic characteristics and a method to make the film. The film comprises a blend of polyolefin with an antistatic agent chosen from fatty acid esters of polyhydroxy alcohols, polyalkoxylated compounds or mixtures thereof.

3 Claims, No Drawings

ANTISTATIC POLYOLEFIN COMPOSITIONS AND ANTISTATIC POLYOLEFIN FILMS MADE THEREFROM, INCLUDING ORIENTED FILMS

This patent application is a continuation of copending U.S. Ser. No. 162,718 filed Mar. 1, 1988 to Havens, now abandoned which is a continuation-in-part of U.S. Ser. No. 918,754 filed Oct. 14, 1986, now U.S. Pat. No. 4,800,115, to Havens now issued as U.S. Pat. No. 4,800,115 on Jan. 24, 1989, disclosures of both of which are incorporated herein by reference.

This invention relates to thermoplastic polymeric compositions having antistatic characteristics. Such antistatic polymeric compositions are useful, for instance, in making films for packaging for electronic devices that are sensitive to static electricity. More particularly, this invention relates to such films wherein at least one layer thereof comprises a copolymer chosen from the polyolefins. Even more particularly, this Continuation in Part relates to such antistatic polyolefin films which are oriented, i.e. heat shrinkable.

BACKGROUND OF THE INVENTION

When two surfaces are brought in contact with each other, a transfer of electrons may occur resulting in a residual static electrical charge when the surfaces are separated. This phenomena is known as triboelectricity. If the surface is composed of a material that is a conductor, the electrons will dissipate quickly thereby eliminating the excess charge. On the other hand, if the surface is composed of a material that is an insulator (a dielectric), the surface charge takes much longer to dissipate.

Thermoplastic polymers, however, are typically excellent insulators, and thus they are unsatisfactory for uses that require an nature that will dissipate charges. As the polymers accumulate high charges promoting an attraction for dust and dirt, they can discharge to any lower potential body with which they come in contact. To modify a polymer so that it will have antistatic characteristics and dissipate charges, the conductivity might be increased which in turn causes an increase in the rate of static dissipation. Increase in conductivity has been accomplished in the past by the use of antistatic agents to promote static-charge decay of surfaces thereby reducing clinging effect, eliminating spark discharge, and preventing accumulation of dust.

It is well known that static charge can be reduced by increasing the moisture content of the atmosphere, and thus the approach in the past has been to use an antistatic agent which will modify the polymer to impart hydrophillic properties to it by providing functional groups that attract moisture to it. For instance, it is well known to apply external antistatic agents onto polymers by conventional coating or painting methods. Also, it is well known to employ internal antistatic agents which are volume dispersed in the polymer; i.e. incorporated into the polymer by compounding or extrusion prior to or during molding or film-forming operations, and work by migrating to the polymer surface. This migration is colloquially referred to in the art of antistatic polymer chemistry as a "blooming" effect. When the antistatic agent has not remained volume dispersed but instead has bloomed to the surface, the mechanism for moisture attraction is the same as with the painted on external antistatic agents. The atmospheric moisture is attracted causing decay or dissipation of static charges, i.e. such films depend on ambient humidity. Accordingly a high rate of blooming is required. Such films can overbloom and lose their antistatic character if subjected to a prolonged hot, humid atmosphere.

Many patents show certain amides, certain amines or certain ammonium compounds as either external or internal antistatic agents.

External antistatic agents are described in the following patents. U.S. Pat. No. 3,223,545 to Gallaugher et al discloses a dialkanol amide of the formula R—C(O)—N[$(CH_2)_n$OH]$_2$ wherein R is a $C_6$–$C_{16}$ alkyl and n is an integer from 2–4, dispersed in a volatile liquid which is applied to the surface of a solid polymer. U.S. Pat. No. 4,268,583 (1981) to Hendy relates to a film having a polypropylene (PP) substrate and a polymeric heat-sealable surface layer on which is present an antistatic composition comprising (a) a quaternary ammonium compound, such as choline chloride, (b) an organic polyol containing at least two free hydroxyl groups, such as glycerol, (c) a glyceride of a long chain fatty acid, such as glyceryl monostearate, and, optionally, (d) an ethoxylated amine salt, such as an ethoxylated tallow amine sulphate.

Internal antistatic agents are described in the following patents. U.S. Pat. No. 3,220,985 to Breslow discloses modifying hydrocarbon polymers with mono-sulfonazide of the formula $RSO_2N_3$, where R is an organic radical inert to the modification reaction, i.e. modifying PP with p-toluene sulfonazide. U.S. Pat. No. 3,164,481 to Shibe discloses combining a quaternary ammonium benzosulfimide with a plastic. U.S. Pat. No. 3,576,649 to Brazier shows a package having an inner layer of heat sealable ethylene polymer and a fatty acid amide. U.S. Pat. No. 3,441,552 to Rombusch et al discloses incorporating an alkoxypropylamine of the formula $R_1$—O—$(CH_2)_3$—N($R_2$) ($R_3$) into a polyolefin where $R_1$ is an alkyl, alkenyl, alkylcycloalkyl, aryl, alkylaryl or alkenylaryl group of 6–25, preferably 8–18 C atoms in the alkyl or alkenyl moieties and 4–18, preferably 6–12 C atoms in the cycloalkyl moiety, and 6–14, preferably 6–10 C atoms in the aryl moiety; $R_2$ and $R_3$ can each represent a H atom, or an alkyl or alkenyl group of 1–5 C atoms, i.e., 100 g octadecyloxy-propyl-N,N-dimethylamine blended with 10 kg PP. U.S. Pat. No. 4,554,210 (1985) to Long et al claims a 1st and 2nd outer layer of polyethylene having a surface resistivity at least $1 \times 10^{16}$ ohms per square; and a middle layer sandwiched therebetween of polyethylene impregnated with a sloughable, electrically-conductive material providing said middle layer with a volume resistivity no more than $1 \times 10^3$ ohms/cm. U.S. Pat. No. 4,600,743 (1986) to Shizuki et al describes an antistatic fiber obtained by melt spinning of a fiber-forming thermoplastic polymer containing at least one of polyoxyalkylene glycol and its derivatives in an amount of not less than 0.5% by weight. U.S. Pat. No. 4,117,193 (1978) to Tsuchiya et al discloses a film prepared by melt extrusion laminating a polymer blend composition of a low-crystalline resin of an ethylene-butene copolymer and a polyolefin resin having incorporated therein a lubricant and an anti-blocking agent onto surface(s) of uniaxially stretched PP film followed by stretching the laminate in the direction perpendicular to the direction in which said PP has been stretched and optionally subjecting the resultant to corona discharge.

ICI Americas' brochure entitled "Atmer ® 129 Internal Antistatic Agent for Thermoplastic Polymers"

advertises using their new glycerol monostearate in PP, low density polyethylene and polyvinylchloride.

U.S. Pat. No. 3,425,981 to Puletti et al, discloses an olefin polymer composition comprising an ethylene polymer resin and from about 0.10 to 15 parts by weight per 100 parts by weight of said ethylene polymer resin of an ethylene oxide polymer having a molecular weight greater than 100,000 and selected from the group consisting of ethylene oxide homopolymers and ethylene oxide copolymers wherein the predominant monomer polymerized therein is ethylene oxide and wherein remaining monomers polymerized therein contain a single epoxide group.

SUMMARY OF THE INVENTION

The present polyolefin containing the antistatic agent may be made into a single ply and/or multiple ply film, and additional advantageous features, further described below, may be obtained when such films are irradiated. The films of the invention will dissipate an applied charge of ±5000 volts direct current in about 20000 ms or less, more preferably about 5000 ms or less, most preferably about 2000 ms or less. A film made simply of polyolefin alone, without the antistatic agent will not dissipate the applied 5000 VDC in about 4000 ms or less, as is illustrated below. The agent may be extruded together with polyolefins known for their strength such as polypropylene (PP), ethylene vinyl acetate (EVA) or linear low density polyethylene (LLDPE). The resultant film is useful for making packaging, such as a bag or over-wrap, for electronic devices that are sensitive to static electricity. Such a film may also be fashioned to have cushioning characteristics by using bubble cap (also known as air cushioning) machinery such as that described in U.S. Pat. Nos. 4,576,669 and 4,579,516 both to Caputo, or that described in U.S. Pat. Nos. 3,416,984, 3,405,020, 3,586,565 and 3,785,899, all assigned to Sealed Air, the disclosures of which are incorporated herein by reference, to make a bubble cap package which provides cushioning and then bagging or wrapping an electronic device therewith. Such a cushioning bubble cap material (also known as cellular material) is also useful in lining a portable work station used for storage and transportation of static electricity sensitive devices such as the work stations disclosed in U.S. Pat. No. 4,494,651 issued in 1985 to Malcolm. Also such a film, which may or may not be in a cushion form, is useful to make a package for devices in a medical operating room where explosive oxygen and/or ether are present and thus protection from static electricity must be provided.

Therefore, it is an object of the present invention to provide an antistatic polymeric composition adapted for use in making a film useful for wrapping static sensitive devices. It is also an object to provide such films having an increased tendency to dissipate electrostatic charges. It is also an object that in a preferred embodiment the films are substantially independent of ambient humidity, i.e. the films are still able to decay an applied 5000 VDC in less than about 4000 ms, more preferably less than about 3000 ms, most preferably less than about 2000 ms even after one or more days in a hot oven.

A feature of the films is that they also have excellent see-through properties which is advantageous for reading code numbers preprinted on a product wrapped with the film.

The present invention provides as a composition of matter adapted for use to produce a thermoplastic polymeric film having antistatic characteristics, a polyolefin blend comprising a polyolefin in admixture with an antistatic agent chosen from fatty acid esters of polyhydroxy alcohols, polyalkoxylated compounds, or mixtures thereof.

The invention also provides an antistatic film comprising at least one layer comprising a blend of a polyolefin in admixture with an antistatic agent chosen from fatty acid esters of polyhydroxy alcohols, polyalkoxylated compounds or mixtures thereof.

The invention also provides a method for the manufacture of a film having antistatic characteristics comprising admixing a polyolefin with an antistatic agent chosen from fatty acid esters of polyhydroxy alcohols, polyalkoxylated compounds, or mixtures thereof and forming a film having at least one layer of the admixture of polyolefin with antistatic agent.

The invention also provides a film having antistatic characteristics comprising at least the film layer structure: polyolefin+antistatic agent chosen from fatty acid esters of polyhydroxy alcohols, polyalkoxylated compounds, or mixtures thereof/polyolefin+antistatic agent chosen from fatty acid esters of polyhydroxy alcohols, polyalkoxylated compounds, or mixtures thereof.

The invention also provides a method for protecting packaged static sensitive devices from electrostatic charges comprising (a) providing a package comprising an antistatic film having at least one layer comprising a blend of a polyolefin in admixture with an antistatic agent chosen from fatty acid esters of polyhydroxy alcohols, polyalkoxylated compounds, or mixtures thereof; and (b) conforming said package about a selected device.

The invention also provides in the preferred embodiment an antistatic film comprising at least one layer of a major amount of a polyolefin and a minor amount of fatty acid ester of polyhydroxy alcohols, polyalkoxylated compounds or a mixture thereof, which film will exhibit a decay time of about 2000 ms or less.

DETAILED DESCRIPTION OF THE INVENTION

There is no particular method required for incorporating the antistatic agent into the polymer, and any of the well-known solvent "wet" blending, melt blending, or dry blending methods, such as those discussed in the "BACKGROUND OF INVENTION" section above, may be employed.

Measuring the antistatic property

The antistatic property is exhibited by the ability of the polymer containing the agent to promote static charge decay, i.e. to dissipate a static charge. The polymer alone will not dissipate a static charge, but the polymer containing the agent is able to dissipate 99% of an applied static charge of ±5000 volts direct current (VDC) in a short amount of time, i.e. less than about 20 seconds, more preferably less than about 5 seconds (5000 milliseconds), most preferably less than about 2 seconds (2000 milliseconds). Federal Test Method Standard 101C, Method 4046.1, "Electrostatic Properties of Materials" states less than 2000 ms and thus it is preferred to have a material that complies with 101C. Decay meters for measuring the time for dissipation of the applied volts are commercially available, such as the 406C static decay meter supplied by Electrotech Systems, Inc.

Some of the films were tested for resistivity. The Department of Defense (DOD) and the Electronics Industry Association (EIA) each have their own standards on surface resistivity of a material as follows:

| SURFACE RESISTIVITY RANGES IN OHMS/SQUARE | | | |
|---|---|---|---|
| Insulative | Antistatic | Static Dissipative | Conductive |
| DOD greater than $10^{14}$ | $10^{14}$ to $10^9$ | $10^9$ to $10^5$ | less than $10^5$ |
| EIA greater than $10^{13}$ | $10^{13}$ to $10^5$ | | less than $10^5$ |

There are two main differences. One is that EIA defines insulative as above about $10^{13}$ ohms/square, whereas DOD defines insulative as above $10^{14}$ ohms/square. The other difference is that EIA has one range of about $10^{13}$ to about $10^5$ ohms/square as antistatic, which results in antistatic being synonymous with static dissipative. On the other hand, DOD divides this range into two separate ranges of about $10^{14}$ to about $10^9$ ohms/square for antistatic and about $10^9$ to about $10^5$ ohms/square for static dissipative. Frequently the literature, especially older literature, equates antistatic with static dissipative in discussions about static electricity.

There is not necessarily a correlation between the surface resistivity of a film and the ability of a film to dissipate charges. Thus, the term "antistatic" as used herein describes a material which can dissipate 99% of an applied static charge of ±5000 VDC in a short amount of time, less than about 20 seconds, more preferably less than about 5 seconds, most preferably less than about 2 seconds (Federal Test Method Standard 101C, Method 4046.1, "Electrostatic Properties of Materials"). However, it is desirable that the film should also have a surface resistivity of about $10^9$ to $10^{14}$ ohms/square (DOD) or about $10^5$ to $10^{13}$ ohms/square (EIA).

Suitable antistatic agents and suitable polymers

Unless specifically set forth and defined or otherwise limited, the terms "polymer" or "polymer resin" as used herein generally include, but are not limited to, homopolymers, copolymers, such as, for example block, graft, random and alternating copolymers, terpolymers etc. and blends and modifications thereof. Furthermore, unless otherwise specifically limited the terms "polymer" or "polymer resin" shall include all possible structures of the material. These structures include, but are not limited to, isotactic, syndiotactic and random symmetries.

The term "polyolefin" as used herein generally includes, but is not limited to, materials such as polyethylene, polypropylene, ethylene-vinyl acetate and the like, the homopolymers, copolymers, terpolymers, etc., thereof, and blends and modifications thereof. The term "polyolefin" shall include all possible structures thereof, which includes, but is not limited to, isotactic, syndiotactic and random symmetries.

Suitable antistatic agents for the polyolefin may be selected from (a) fatty acid esters of polyhydroxy alcohols, (b) polyalkoxylated compounds (i.e. polyethers) such as polyethylene oxides, polypropylene oxides, polybutylene oxides, polytetramethylene oxides, the reaction products of polyalkoxylates with fatty alcohols, the reaction products of polyalkoxylates with fatty acid esters of polyhydroxyl alcohols (for instance polyalkoxylate reaction products of fatty acids, of fatty glycols, of fatty sorbitols, of fatty sorbitans, and of fatty alcohols), or a mixture thereof, or a mixture of (a) and (b). Suitable fatty group chains in either (a) or (b) are desirably from about $C_8$ to about $C_{50}$, or even higher. Natural fatty groups are in the lower range and synthetic ones are in the higher range. For instance, Unithox (TM), a reaction product of polyalkoxylate with fatty alcohol is an ethoxylated synthetic fatty alcohol supplied by Petrolite Corporation, which may have up to about 50 carbons in the fatty group chain. The polyether chains in the suitable polyalkoxylated compounds are of the formula $(-OC_xH_{2x}-)_n$ wherein x is from 2 to about 8, wherein the alkyl group is straight or branched, and wherein n is from 2 to about 1000. Each agent will work by itself in a polymeric composition, as such antistatic compositions exhibit excellent static decay times; however, the combination of agents (a) and (b) in a polymeric composition is more desirable as these antistatic compositions display even shorter static decay times. Desirable fatty acid ester substituted polyhydroxy alcohols include, but are not limited to, the polyhydroxy alcohols selected from the $C_2$ to $C_6$ alcohols, such as ethylene glycol, 1,3-propylene glycol, 1,2-propylene glycol, 1,2butanediol, meso 2,3-butanediol, 1,4-butanediol, pinacol, pentaerythritol, 1,2,3,4,5-pentanepentol, sorbitan, or sorbitol, which polyhydroxy alcohol has been substituted with one or more fatty acid ester groups. A very desirable polyether is polyethylene oxide, such as that sold by Union Carbide under the trade name Polyox, or is polytetramethylene oxide, such as that sold by du Pont under the trade name Terathane. A very desirable polyalkoxylate of a fatty alcohol is a polyethoxylated cetyl alcohol (PECA), as represented by the formula $C_{16}H_{33}-O(-C_2H_4-O-)_nH$ wherein n is from 2 to about 50. Antistatic agents chosen from (a), (b) or a mixture thereof are especially suitable for use with thermoplastic polymers chosen from the polyolefins, more particularly the polyethylenes. Polyethylenes are further described in the "Definitions" below. Advantageously, the polyolefin contains less than about 20% by weight, more preferably less than about 15% by weight of the antistatic agent chosen from (a), (b) or a mixture thereof. Also, it is advantageous if the composition of polyolefin and antistatic agent includes a small amount of about 10% by weight or less, more desirably about 7% by weight or less of an antiblock, to help alleviate any tackiness. A suitable antiblock is EPE 8160 supplied by Teknor Apex or Siloid 378 supplied by Davison Chemicals. Certain of these films will still perform excellently as an antistatic film (i.e. dissipate 5000 volts in less than the highly preferred 2000 ms) even after abuse such as a hot oven (160° F.).

Manufacture of Films

Typically, in the manufacture of films, a suitable polymer usually in the form of pellets or the like, is brought into a heated area where the polymer feed is melted and heated to its extrusion temperature and extruded as a tubular "blown bubble" through an annular die. Other methods, such as "slot die" extrusion wherein the resultant extrudate is in planar, as opposed to tubular, form are also well known. If heat shrinkable film is desired, then after extrusion, the film is typically cooled and then reheated and stretched, i.e. oriented by "tenter framing" or by inflating with a "trapped bubble", to impart the heat-shrinkable property to the film, as is further described below. High energy irradiation, typically via an electron beam, preferably takes place prior to the stretching for orienting the film. However, for some embodiments of the present invention, such irradiation is not necessary since a very suitable packaging film is obtained without irradiation. Below, first is described the general process for making and orienting film. Then irradiation is described.

More particularly, manufacturing of films may be accomplished as follows. For instance, the manufacture of shrink films may be generally accomplished by extrusion (single layer films) or coextrusion (multi-layer films) of thermoplastic resinous materials which have been heated to or above their flow or melting point from an extrusion or coextrusion die in, for example, either tubular or planar (sheet) form, followed by a post extrusion cooling. The stretching for orientation may be conducted at some point during the cool down and while the film is still hot and within its orientation temperature range followed by completing the cooling. Alternatively, after the post extrusion cooling, the relatively thick "tape" extrudate is then reheated to a temperature within its orientation temperature range and stretched to orient or align the crystallites and/or molecules of the material and then cooled. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range, the material may be effectively oriented. The terms "orientation" or "oriented" are used herein to describe generally the process steps and resultant product characteristics obtained by stretching and immediately cooling a resinous thermoplastic polymeric material which has been heated to a temperature within its orientation temperature range so as to revise the intermolecular configuration of the material by physical alignment of the crystalites and/or molecules of the material to improve certain mechanical properties of the film such as, for example, shrink tension and orientation release stress. Both of these properties may be measured in accordance with ASTM D 2838-81. When the stretching force is applied in one direction monoaxial orientation results. When the stretching force is simultaneously applied in two directions biaxial orientation results. The term oriented is also herein used interchangeably with the term "heat-shrinkable" with these terms designating a material which has been stretched and set by cooling while substantially retaining its stretched dimensions. An oriented (i.e. heat-shrinkable) material will tend to return to its original unstretched (unextended) dimensions when heated to an appropriate elevated temperature.

Returning to the basic process for manufacturing the film as discussed above, it can be seen that the film, once extruded (or coextruded if it is a multi-layer film) and initially cooled, is then reheated to within its orientation temperature range and oriented by stretching. The stretching to orient may be accomplished in many ways such as, for example, by "trapped bubble" techniques or "tenter framing". These processes are well known to those in the art and refer to orientation procedures whereby the material is stretched in the cross or transverse direction (TD) and/or in the longitudinal or machine direction (MD). After being stretched, the film is quickly cooled while substantially retaining its stretched dimensions to cool the film rapidly and thus set or lock-in the oriented molecular configuration.

Of course, if a film having little or no orientation is desired, e.g. non-oriented or non-heat shrinkable film, the film may be formed from a non-orientable material or, if formed from an orientable material may be formed from a tube by using a "trapped bubble" technique commonly known as the "hot blown" technique. In forming a hot blown film, the tube is not cooled initially after extrusion or coextrusion but rather is first stretched by a hot blown bubble essentially immediately after extrusion while the tube is still at an elevated temperature above the orientation temperature range of the material. Thereafter, the film is cooled, by well-known methods. Those of skill in the art are well familiar with this process and the fact that the resulting film has substantially unoriented characteristics. Other methods for forming unoriented films are well known. Exemplary, is the method of cast extrusion or cast coextrusion which, likewise, is well known to those in the art.

Whichever film has been made (the non-oriented molecular configuration or the stretch-oriented "heat-shrinkable" molecular configuration), it may then be stored in rolls and utilized to package a wide variety of items. If the material was manufactured by "trapped bubble" techniques the material may still be in tubular form or it may have been slit and opened up to form a sheet of film material. In this regard, the product to be packaged may first be enclosed in the material by heat sealing the film to itself where necessary and appropriate to form a pouch or bag and then inserting the product therein. Alternatively, a sheet of the material may be utilized to overwrap the product. These packaging methods are all well known to those of skill in the art.

If the material is of the heat-shrinkable, i.e. "oriented", type, then after wrapping, the enclosed product may be subjected to elevated temperatures, for example, by passing the enclosed product through a hot air tunnel. This causes the enclosing heat shrinkable film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such bag or pouch forming methods, likewise, are well known to those of skill in the art.

Alternative methods of producing films of this type are known to those in the art. One well-known alternative is the method of forming a multi-layer film by an extrusion coating rather than by an extrusion or coextrusion process as was discussed above. In extrusion coating a first tubular layer is extruded and thereafter an additional layer or layers is simultaneously or sequentially coated onto the outer surface of the first tubular layer or a successive layer.

The above general outline for manufacturing of films is not meant to be all inclusive since such processes are well known to those in the art. For example, see U.S. Pat. Nos. 4,274,900; 4,229,241; 4,194,039; 4,188,443; 4,048,428; 3,555,604; 3,741,253; 3,821,182 and 3,022,543. The disclosures of these patents are generally representative of such processes and are hereby incorporated by reference.

Many other process variations for forming films are well known to those in the art. For, example, conventional pressing, thermoforming or laminating techniques (including corona laminating) may be employed. For instance, multiple layers may be first coextruded with additional layers thereafter being laminated thereon, or two multi-layer tubes may be coextruded with one of the tubes thereafter being laminated onto the other.

If a heat shrinkable, i.e. "oriented", film is desired, after extrusion and cooling, then after irradiation (or without irradiation), the tube may then be heated to soften it, and then the softened tube is passed through pinch rolls and stretch oriented by the trapped blown bubble technique discussed above.

Irradiation may be accomplished by the use of high energy electrons, ultra violet radiation, X-rays, gamma rays, beta particles etc. Preferably, electrons are employed up to about 20 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

It is also generally well known in the art that irradiation, such as by electron beam irradiation, of certain polymeric film materials generally results in a material having improved heat shrink properties, abuse resistance, structural integrity, tensile strength, puncture resistance, and/or delamination resistance. Such physical improvements from irradiation, are discussed in U.S. Pat. No. 3,022,543 (1962) to Baird et al, U.S. Pat. No. 4,178,401 (1979) to Weinberg and U.S. Pat. No. 3,741,253 to Brax et al.

Suitable films have the structure: polymer+antistatic agent, or the structure: polymer+antistatic agent/polymer+antistatic agent. Such also have excellent see-through properties which is advantageous for reading code numbers preprinted on a product wrapped with the film. More particularly, some very advantageous films have the structure: LLDPE+antistatic agent/LLDPE+antistatic agent/LLDPE+antistatic agent. Embodiments of films with these layers are illustrated in the Examples below.

The term "polyethylene" as used herein, which "polyethylene" may be employed as a polyolefin in the film of the invention, refers to families of resins obtained by substantially polymerizing the gas ethylene, $C_2H_4$. By varying the comonomers, catalysts and methods of polymerization, properties such as density, melt index, crystallinity, degree of branching, molecular weight and molecular weight distribution can be regulated over wide ranges. Further modifications are obtained by other processes, such as halogenation, and compounding additives. Low molecular weight polymers of ethylene are fluids used as lubricants; medium weight polymers are waxes miscible with paraffin; and the high molecular weight polymers are resins generally used in the plastics industry. Polyethylenes having densities ranging from about 0.900 g/cc to about 0.935 g/cc are called low density polyethylenes (LDPE) while those having densities from about 0.936 g/cc to about 0.940 g/cc are called medium density polyethylenes (MDPE), and those having densities from about 0.941 g/cc to about 0.965 g/cc and over are called high density polyethylenes (HDPE). The older, classic low density types of polyethylenes are usually polymerized at high pressures and temperatures whereas, the older, classic high density types are usually polymerized at relatively low temperatures and pressures.

The term "linear low density polyethylene" (LLDPE) as used herein, for a type of polyethylene, refers to the newer copolymers of a major amount of ethylene with a minor amount of one or more comonomers selected from $C_4$ to $C_{10}$ alpha olefins such as butene-1, pentene-1, hexene-1, octene-1, etc. in which the molecules thereof comprise long chains with few side chains or branched structures achieved by low pressure polymerization. The side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density preferably in the range from about 0.911 g/cc to about 0.935 g/cc, and more preferably in the range of from about 0.912 g/cc to about 0.928 g/cc for film making purposes. The melt flow index of LLDPE generally ranges from between about 0.1 to about 10 grams per ten minutes and preferably between from about 0.5 to about 3.0 grams per ten minutes. LLDPE resins of this type are commercially available and are manufactured in low pressure vapor phase and liquid phase processes using transition metal catalysts. LLDPE is well known for its structural strength and anti-stress-cracking properties. Thus, it serves well in a wrap around material for packaging electronic components which typically have sharp projections. Also, LLDPE is known for its favored properties in the heat shrink process, and thus is well suited if it is desired to make a heat shrinkable film as discussed above. Also, very low density linear low density polyethylenes (VLDPE) may be employed, and such have a density from about 0.910 g/cc to about 0.860 g/cc, or even lower.

The term "ethylene vinyl acetate copolymer" (EVA) as used herein for a type of polyolefin useful in the film refers to a copolymer formed from ethylene and vinyl acetate (VA) monomers. The ethylene derived units in the copolymer are present in major amounts and the VA derived units in the copolymer are present in minor amounts. EVA is also known for having structural strength, as LLDPE does. For film making purposes, it is preferred that the VA content of the EVA be from about 3% to about 25%.

The term "polypropylene" (PP) as used herein for a type of polyolefin useful in the film refers to polymers of propylene and includes homopolymers, copolymers, such as for example block, graft, random, and alternating copolymers, terpolymers, etc., and blends and modifications thereof.

Blends of all families of polyolefins, such as blends of EVA, VLDPE, PP, and LLDPE, may also be advantageously employed.

An "oriented" or "heat shrinkable" material is defined herein as a material which, when heated to an appropriate temperature above room temperature (for example 96° C.), will have a free shrink of 5% or greater in at least one linear direction.

As used herein the term "extrusion" or the term "extruding" is intended to include coextrusion, extrusion coating, or combinations thereof, whether by tubular methods, planar methods, or combinations thereof.

Melt index is as per ASTM D 1238, Condition E.

| MATERIALS | |
|---|---|
| Designation | Description |
| PEO | Polyethylene oxide, supplied by Union Carbide Corp. |
| LMDPE | Dowlex TM 2037, supplied by Dow Chemical. The density = 0.935, and the melt index = 2.5. |
| LLDPE(1) | Dowlex TM 2045.03, supplied by Dow Chemical Company, Midland, Michigan. It has a melt index of 1.0 and a density of 0.920, and the comonomer is octene. |
| LLDPE(2) | Escorene TM LL 3001.63, supplied by Exxon. It has a melt index of 1.0 and a density of 0.918 and the comonomer is hexene. It contains about 200 ppm polyethylene oxide as received from the supplier, Exxon. |
| LDPE(1) | Chemplex 3405, supplied by Chemplex Company, Rolling Meadows, Illinois. Density = 0.922 and melt index = 3.6. |
| LDPE(2) | PE722, supplied by Dow Chemical. Density = 0.916, and melt index = 8.0. |
| Antiblock(1) | EPE 8160 antiblock, a clear concentrate containing a micron sized silica supplied by Teknor Apex. |
| Antiblock(2) | Siloid 378 antiblock, a micron sized silica, supplied by Davison Chemical, a Division of W. R. Grace. |
| PECA | Trycol TM 5984, a polyethoxylated cetyl alcohol supplied by Emery Industries. |
| GMS | CPH-53-N, food grade glyceryl monostearate supplied by C. P. Hall. |
| EVA(1) | Alathon F-3445, an EVA having about 3.5% VA, supplied by Du Pont. |
| EVA(2) | Elvax 3130, an EVA having about 12% VA, supplied by Du Pont. |
| EVA(3) | PE 202 CS-284, an EVA having about 3.3 ± 0.2% VA, supplied by EL Paso and its melt flow at condition E is 2.0 ± 0.2. |
| EVA(4) | LD-318.92, an EVA having about 9% VA, supplied by Exxon. It has a melt index of 2.0. |
| EVA(5) | Exxon 32.89, an EVA having about 4.5% VA. Its melt index is about 10. It is supplied by Exxon. |
| Clay | Kaopolite SF-0 is a calcined clay, supplied by Rudeau Industrial Sales. |
| Wax | Acrawax ® C, supplied by Glyco Chemicals. |
| Erucamide | Kemamide E, supplied by Humco Products. |
| Behenamide | Kemamide B, supplied by Humco Products. |

The following Examples illustrate the preferred embodiments of the invention. It is not intended to limit the invention thereby.

EXAMPLES

In the examples below, additives were preblended into the polymer feed.

Except for the films of Example XI, which were oriented, the films were made by a conventional method of manufacturing, known as tubular extrusion, and colloquially called the hot blown bubble technique to achieve an essentially non-oriented (non-heat-shrinkable) film. A tubular process was utilized wherein a primary coextruded tube of the film was biaxially stretched with internal pressure in the transverse direction and with the use of pinch rolls at different speeds in the machine direction. Then the stretched bubble was cooled and collapsed, and the film wound up as flattened, seamless, tubular film to be used later to make bags, bubble cap, et cetera. When film is made by a tubular process, the tubular film is desirably fully coextruded, as full coextrusion is advantageous in that all layers of the multilayer film are directly melt jointed for enhanced interlayer strength.

For the oriented films of Example XI, the film once extruded and cooled, was then reheated to within its orientation temperature range and oriented by stretching via a trapped bubble in both the machine direction (MD) and transverse direction (TD), and then quickly cooled while retaining its stretched dimensions to lock-in the oriented configuration. Also, in some embodiments in Example XI, the film structure was guided through an ionizing radiation field; for example, through the beam of an electron accelerator to receive a radiation dosage in the range up to about 20 megarads (MR) prior to the stretch orienting. It is known that irradiation enhances structural integrity, as measured by abuse resistance, tensile strength, and/or puncture resistance, et cetera, and in a multi-layer film irradiation provides enhanced delamination resistance.

In the Examples below, the ability of film samples of about $3\frac{1}{8} \times 7\frac{1}{2}$ inches (about 7.9×19 cm) to dissipate a static charge was measured on a static decay meter using the procedure described in Federal Test Method Standard 101C, Method 4046.1, "Electrostatic Properties of Materials" (change notice dated Oct. 8, 1982). Samples were subjected to various abusive conditions, such as a hot oven at 160° F. (71° C.), or a water shower, as indicated. It is mentioned, that although Federal Test Method 101C states equilibration shall be for 24 hours, where noted, some samples were equilibrated at about room temperature (RT) at less than about 15% relative humidity (RH) for the time indicated rather than for 24 hours, after the conditioning. For instance, some samples are indicated "1 hour hold". For measuring decay time, each sample was placed in a static decay meter at room temperature, 72°–73° F., (22°–23° C.) and charged to ±5000 VDC (volts direct current) at less than about 15% RH, and the time for 99% of the charge to dissipate (decay to technical zero) was then measured, and is indicated in milliseconds (ms).

Example I

Using the method of tubular coextrusion followed by hot blowing a bubble to make a non-oriented film as described above, a single layer film was made having the following composition: Escorene LL 3001.63 LLDPE with 1% by weight Trycol 5984 polyethoxylated cetyl alcohol and 0.5% by weight glyceryl monostearate CPH-53-N, hereinafter designated as CF1. After equilibrating the sample for 1 hour (instead of 24 hours) at 72° F. (22° C.) at less than 15% RH, the static decay time tested as per Federal Test Method 101C was found to be 130 ms. The sample was tested again 4 days later, and the static decay time was found to be 77 ms.

Example II

A single layer film was made as in Example I, but comprising CF1+5% by weight EPE 8160 antiblock.

Example III

Four additional samples (a, b, c, and d) of CF1 of Example I were equilibrated for 1 hour (instead of 24 hours) at 72° F. (22° C.) at less than 15% relative humidity. Then they were tested for static decay. Then, each of the 4 samples was subjected to a different treatment (some of which were abusive, such as a 160° F. oven or a vacuum jar) for 88 hours, as indicated in Table A below, and again equilibrated for 1 hour at 72° F. (22°

C.) at less than 15% RH, and checked again for static decay.

TABLE A

| Sample | 88 Hour Treatment | Static Decay Time Before Treatment (ms) | Static Decay Time After 88 Hour Treatment (ms) |
|---|---|---|---|
| a | 72° F. (22° C.) 15% RH | 370 | 101 |
| b | 160° F. Oven (71° C. Oven) in which a beaker of water was kept to maintain a humid atmosphere | 67 | 141 |
| c | 160° F. Oven (71° C. Oven) without the beaker of water | 188 | 51 |
| d | Vacuum jar maintained at a pressure under 20 Torr at 73° F. (23° C.) | 312 | 87 |

As can be seen from the Table, even after abusive treatments of heat, humidity and vacuum, the film samples still had excellent static decay times well within the highly desired 2000 ms or less range.

Example IV

Single layer films CF2, CF3, and CF4, were made as in Example I, except that instead of the polyethylene Escorene LL 3001.63, the following polyethylenes were used: CF2 was Alathon F-3445 EVA with 1% by weight Trycol 5984 polyethoxylated cetyl alcohol and 0.5% by weight glyceryl monostearate CPH-53-N; CF3 was Elvax 3130 EVA with 1% by weight Trycol 5984 and 0.5% by weight glyceryl monostearate CPH-53-N; and CF4 was Chemplex 3405 LDPE with 1% by weight Trycol 5984 and 0.5% by weight glyceryl monostearate. Samples were equilibrated at 72° F. (22° C.) for 1 hour (instead of 24 hours) at less than 15% RH and then checked for static decay. The results are summarized in Table B below.

TABLE B

| Sample | Static Decay Time (ms) |
|---|---|
| CF2 | 552 |
| CF3 | 173 |
| CF4 | 58 |

Example V

To illustrate the effect of a lesser static time by employing a combination of both Trycol 5984 polyethoxylated cetyl alcohol and glyceryl monostearate, as described above in Example XVI, two single layer films were made as in Example I, but one of them, CF1(a), was made without glycerol monostearate, and the other CF1(b) was made without Trycol 5984 polyethoxylated cetyl alcohol. CF1(a) was Escorene LL 3001.63 LLDPE with 1% by weight Trycol 5984. CF1(b) was Escorene LL 3001.63 LLDPE with 0.5% by weight glyceryl monostearate. Samples were equilibrated at 72° F. (22° C.) for 1 hour (instead of 24 hours) at less than 15% RH and then checked for static decay. The results are summarized in Table C below.

TABLE C

| Sample | Static Decay Time (ms) |
|---|---|
| CF1(a) | 1203 |
| CF1(b) | 485 |

As can be seen the static decay time of 77 ms of Example I was much less than the static decay times reported in Table C.

Example VI

Using the method of tubular coextrusion followed by hot blowing a bubble to make a non-oriented film as described above, a multi-ply film was made having the following structure wherein CF1 was Escorene LL 3001.63 LLDPE with 1% by weight Trycol 5984 and 0.5% by weight glyceryl monostearate CPH-53-N.:

TABLE D

| Layer | Material |
|---|---|
| 1 | CF1 + 5% by weight EPE 8160 |
| 2 | CF1 |
| 3 | CF1 + 5% by weight EPE 8160 |

A sample was left to sit at ambient conditions for about 88 hours and then equilibrated for 1 hour (instead of 24 hours) at 72° F. (22° C.) at less than 15% RH, and the static decay time tested. The time to decay was found to be 101 milliseconds.

Example VII

A 3-layer film was made as in Example VI, except that the film was irradiated at about 4.3 MR after coextrusion and hot blowing the bubble. The resultant was observed to be of improved structural integrity. A sample was left to sit at ambient conditions for about 88 hours and then equilibrated for 1 hour (instead of 24 hours) at 72° F. (22° C.) at less than 15% RH and the static decay time was found to be 53 milliseconds.

The film was cut into samples for running abusive tests. The samples were equilibrated for 1 hour (instead of 24 hours) at 72° F. (22° C.) at less than 15% RH. Then, they were tested for surface resistivity and static decay. Then, each sample was subjected to a different abusive treatment for 88 hours, (such as a 160° F. oven abuse, a vacuum jar abuse, or a 24 hour water shower abuse) as indicated in Table E below, and again equilibrated for 1 hour at 72° F. (22° C.) at less than 15% RH and checked again for surface resistivity static decay.

TABLE E

| Sample | (88 Hours) Abusive Treatment | Before 88 Hour Treatment | | After 88 Hour Treatment | |
|---|---|---|---|---|---|
| | | Surface Resistivity (ohms/square) | Static Decay (ms) | Surface Resistivity (ohms/square) | Static Decay (ms) |
| a | 72° F. (22° C.) | $1 \times 10^{10}$ | 39 | $2 \times 10^{10}$ | 44 |
| b | 160° F. Oven (71° C. Oven) in which a beaker of water was kept to maintain as humid atmosphere | $6 \times 10^{10}$ | 46 | $9 \times 10^{10}$ | 154 |
| c | 160° F. Oven (71° C. Oven) without the beaker of | $6 \times 10^{10}$ | 39 | $9 \times 10^{10}$ | 144 |

TABLE E-continued

| Sample | (88 Hours) Abusive Treatment | Before 88 Hour Treatment | | After 88 Hour Treatment | |
|---|---|---|---|---|---|
| | | Surface Resistivity (ohms/ square) | Static Decay (ms) | Surface Resistivity (ohms/ square) | Static Decay (ms) |
| d | water Vacuum jar maintained at a pressure under 20 Torr at 73° F. (23° C.) | $5 \times 10^{10}$ | 52 | $4 \times 10^{10}$ | 115 |
| e | 24 hour water shower after which sample was blotted dry with a towel | $7 \times 10^{10}$ | 49 | $1 \times 10^{14}$ | Over 20000 ms (Over 20 Seconds) |

As can be seen from the Table, surface resistivity either before or after each abusive treatment was still in the desirable DOD and EIA antistatic range of about $10^9$ to $10^{14}$, and likewise either before or after each abusive treatment (except for the 24 hour water shower), the static decay time was less than the highly desirable 2000 ms or less.

Example VIII

Another set of samples of the unirradiated film of Example VI were subjected to the different 88 hour treatment abuses as in Example XVIII above, and then after equilibration for 1 hour (instead of 24 hours) at 72° F. (22° C.) at less than 15% RH checked for static decay. The results are summarized in Table F below.

TABLE F

| Abusive Treatment | Static Decay Time (Milliseconds) |
|---|---|
| 160° F. Oven (71° C. Oven) in which a beaker of water was kept to maintain a humid atmosphere | 141 |
| 160° F. Oven (71° C. Oven) without the beaker of water | 51 |
| Vacuum jar maintained at a pressure under 20 Torr at 73° F. (23° C.) | 87 |

As can be seen from the Table, even after abusive treatments of heat, humidity and vacuum, the film samples still had excellent static decay times well less than the highly desired 2000 milliseconds or less.

Example IX

Samples of the irradiated film of Example VII were subjected to the different 88 hour treatment abuses as in Example III above, equilibrated for 1 hour (instead of 24 hours) at 72° F. (22° C.) at less than 15% RH, and checked for static decay. Results are summarized in Table G below.

TABLE G

| Abusive Treatment | Static Decay Time (Milliseconds) |
|---|---|
| 160° F. Oven (71° C. Oven) in which a beaker of water was kept to maintain a humid atmosphere | 370 |
| 160° F. Oven (71° C. Oven) without the beaker of water | 218 |

TABLE G-continued

| Abusive Treatment | Static Decay Time (Milliseconds) |
|---|---|
| Vacuum jar maintained at a pressure under 20 Torr at 73° F. (23° C.) | 262 |

As can be seen from the Table, even after abusive treatments of heat, humidity and vacuum, the film samples still had excellent static decay times well under the highly desired 2000 milliseconds or less.

Example X

A single layer film was made as in Example I, but comprising 75% CF1+20% Escorene LL 3001.63 LLDPE+5% EPE 8160 antiblock by weight. Samples were tested 2 times on each side thereof, wherein 1 of the 2 was at +5000 VDC and the other was at −5000 VDC, for a total of 4 tests by applying ±5000 VDC and measuring the decay time as described by Federal Test Method 101C, Method 4046.1. None was subjected to preconditioning equilibration, but tested as is. Conditions inside the decay meter were about 22°–23° C. and about 13–15% RH. All but one sample was subjected to abusive treatment for 64 hours of a 160° F. (71° C.) oven in which a beaker of water was kept to maintain a humid atmosphere. The results are summarized in Table H below.

TABLE H

| | Side #1 | | Side #2 | | |
|---|---|---|---|---|---|
| 64 Hour Abusive Treatment | +5000 VDC Decay Time (ms) | −5000 VDC Decay Time (ms) | +5000 VDC Decay Time (ms) | −5000 VDC Decay Time (ms) | Average Decay Time of 4 Tests (ms) |
| No | 152 | 147 | 172 | 176 | 162 |
| Yes | 460 | 455 | 476 | 464 | 464 |
| Yes | 580 | 588 | 607 | 588 | 591 |

Example XI

Oriented, i.e. heat-shrinkable, 3-layer, films were made by first extruding a tube with hot blowing and cooling the tube, and then heating the tube to soften it. Sometimes, at this point sleeve samples were taken for testing, and those are so designated as N-I for not irradiated and N-O for not oriented. Then the softened tube was passed through pinch rolls and biaxially stretch oriented by the trapped blown bubble technique discussed above. The degree of orientation in the transverse direction (TD) and machine direction (MD) is noted in the samples below. Samples of oriented film taken at this point are designated as N-I for not irradiated. Some oriented films were also irradiated prior to the stretch orientation, and the MR is also indicated in the samples. Films of the structure: layer 1/layer 2/layer 3 were made having the compositions designated in Table J(i) below. Percentages are by weight.

TABLE J(i)

FILM 1 WAS PRODUCED IN THREE VERSIONS:
Film 1a-1 mil(25 micro m) 8 MR IRRAD., 3.2 TD × 3.5 MD ORIENTATION RATIO
Film 1b-1 mil(25 micro m) NOT IRRAD., 3.2 TD × 3.5 MD ORIENTATION RATIO
Film 1c-1.5 mil(38 micro m) 8 MR IRRAD., 3.1 TD × 3.7 MD ORIENTATION RATIO
(1/6/1 thickness ratio of layer 1/layer 2/layer 3)

LAYER

TABLE J(i)-continued

| LAYERS 1 AND 3 | | | COMPOSITION |
|---|---|---|---|
| 5.00% ANTIBLOCK MASTERBATCH | 90.00% | LDPE(2) | 4.50% |
| | 10.00% | Antiblock(2) | 0.50% |
| 95.00% RESIN | 98.50% | LLDPE(1) | 93.56% |
| | 1.00% | PECA | 0.95% |
| | 0.50% | GMS | 0.47% |
| | 0.02% | PEO | 0.02% |
| | | TOTAL | 100.00% |

| LAYER 2 | | | LAYER COMPOSITION |
|---|---|---|---|
| 100.00% CORE RESIN | 98.50% | LLDPE(1) | 98.48% |
| | 1.00% | PECA | 1.00% |
| | 0.50% | GMS | 0.50% |
| | 0.02% | PEO | 0.02% |
| | | TOTAL | 100.00% |

FILM 2-1 mil (25 micro m), 2 MR IRRAD., 4.8 TD × 5.2 MD ORIENTATION RATIO
(1/2/1 thickness ratio of layer 1/layer 2/layer 3)

| LAYERS 1 AND 3 | | | LAYER COMPOSITION |
|---|---|---|---|
| 15.00% SLIP + ANTIBLOCK MASTERBATCH | 91.50% | EVA(3) | 13.73% |
| | 4.00% | CLAY | 0.60% |
| | 2.00% | WAX | 0.30% |
| | 2.00% | ERUCAMIDE | 0.30% |
| | 0.50% | BEHENAMIDE | 0.08% |
| 85.00% BLEND | 54.72% | LLDPE(1) | 46.50% |
| | 27.36% | LMDPE | 23.25% |
| | 16.42% | EVA(3) | 13.95% |
| | 1.00% | PECA | 0.85% |
| | 0.50% | GMS | 0.42% |
| | 0.02% | PEO | 0.02% |
| | | TOTAL | 100.00% |

| LAYER 2 | | | LAYER COMPOSITION |
|---|---|---|---|
| 100.00% CORE RESIN | 98.50% | LLDPE(1) | 98.48% |
| | 1.00% | PECA | 1.00% |
| | 0.50% | GMS | 0.50% |
| | 0.02% | PEO | 0.02% |
| | | TOTAL | 100.00% |

FILM 3-1 mil(25 micro m), 2 MR IRRAD., 4.8 TD × 5.2 MD ORIENTATION RATIO
(1/2/1 thickness ratio of layer 1/layer 2/layer 3)

| LAYERS 1 AND 3 | | | LAYER COMPOSITION |
|---|---|---|---|
| 15.00% SLIP + ANTIBLOCK MASTERBATCH | 91.50% | EVA(3) | 13.73% |
| | 4.00% | CLAY | 0.60% |
| | 2.00% | WAX | 0.30% |
| | 2.00% | ERUCAMIDE | 0.30% |
| | 0.5% | BEHENAMIDE | 0.08% |
| 85.00% BLEND | 54.72% | LLDPE(2)** | 46.51% |
| | 27.36% | LMDPE | 23.26% |
| | 16.42% | EVA(3) | 13.95% |
| | 1.00% | PECA. | 0.85% |
| | 0.50% | GMS | 0.43% |
| | | TOTAL | 100.00% |

| LAYER 2 | | | LAYER COMPOSITION |
|---|---|---|---|
| 100.00% CORE RESIN | 98.50% | LLDPE(2) | 98.50% |
| | 1.00% | PECA. | 1.00% |
| | 0.50% | GMS | 0.50% |
| | | TOTAL | 100.00% |

**LLDPE(2), which was LL3001.63, contained 200 ppm of PEO as received from supplier.

Testing of Films

Films 1b and 1c were tested for surface resistivity, and static decay time, after 1 hour equilibration at RT and less than 15% RH. The results were as indicated in Table J(ii) below. Film 1a was not tested.

TABLE J(ii)

Film 1b N-O and N-I = non-oriented sleeves of the non-irradiated film of J1b, about 1 mil thick
Film 1c = oriented, irradiated to a dosage of 8 MR, about 1.5 mil thick
Film 1b N-I = oriented, non-irradiated, about 1 mil thick

| FILM SAMPLE | SUR. RES. (OHMS/SQ) | DECAY (ms) | THICKNESS MIL (micron) |
|---|---|---|---|
| 1b N-O N-I | $3.31 \times 10^{10}$ | 508 | 1.17 (29.7) |
| AVER. STD. DEV.* | $1.22 \times 10^{10}$ | 107.23 | 0.113 (2.9) |
| 95% C.L.** | $1.44 \times 10^{10}$ | 126.16 | 0.133 (3.4) |
| 1c | $3.24 \times 10^{10}$ | 894.5 | 1.59 (40.4) |
| AVER. STD. DEV. | $3.33 \times 10^{9}$ | 44.65 | 0.0675 (1.7) |
| 95% C.L. | $3.92 \times 10^{9}$ | 52.53 | 0.079 (2.0) |
| J1b N-I | $6.76 \times 10^{10}$ | 874 | 0.889 (22.6) |
| AVER. STD. DEV. | $4.57 \times 10^{9}$ | 95.14 | 0.035 (0.9) |
| 95% C.L. | $5.37 \times 10^{9}$ | 111.9 | 0.0414 (1.1) |

*AVER. STD. DEV. = Average standard deviation
**95% C.L. = 95 Percent confidence level As can be seen, thickness appeared to have had no significant effect on surface resistivity.

The remainder of the testing of samples of films 1b and 1c was for static decay time only and the results are reported in Table J(iii) below. Equilibration was for 1 hour, except for those designated "24 hour hold". The oven was at 71° C. without any beaker of water.

TABLE J(iii)

| FILM SAMPLE | | STATIC DECAY (ms) |
|---|---|---|
| 1b N-O N-I | 24 HOUR HOLD | 577 |
| AVER. STD. DEV. | | 169.7 |
| 95% C.L. | | 199.6 |
| 1c | 24 HOUR HOLD | 390.75 |
| AVER. STD. DEV. | | 84.4 |
| 95% C.L. | | 99.31 |
| 1b N-I | 24 HOUR HOLD | 463.75 |
| AVER. STD. DEV. | | 144.63 |
| 95% C.L. | | 170.15 |
| 1b N-O N-I | 24 HOUR HOT DRY OVEN | 1419 |
| 1c | 24 HOUR HOT DRY OVEN | 5771 |
| AVER. STD. DEV. | | 3538 |
| 95% C.L. | | 4163 |
| 1b | 24 HOUR HOT DRY OVEN | 1st reading = 5622 Other 3 samples would not charge all the way up. |
| 1b N-O N-O | 1 HR SHOWER | Held charge |
| 1c | 1 HR SHOWER | Held charge |
| 1b N-I | 1 HR SHOWER | Held charge |
| 1b N-O N-I | 1 DAY HOT DRY OVEN | 6272 |
| 1b N-O N-I | 2 DAY HOT DRY OVEN | 471 |
| 1b N-O N-I | 3 DAY HOT DRY OVEN | 281 |
| 1b N-O N-I | 4 DAY HOT DRY OVEN | 2081 |
| 1b N-O N-I | 5 DAY HOT DRY OVEN | 642 |
| 1b N-O N-I | 6 DAY HOT DRY OVEN | 3112 |
| 1b N-O N-I | 7 DAY HOT DRY OVEN | 939 |
| 1b N-O N-I | 8 DAY HOT DRY OVEN | 3103 |
| 1b N-O N-I | 9 DAY HOT DRY OVEN | 9244 |
| 1b N-O N-I | 10 DAY HOT DRY OVEN | 6022 |
| 1b N-O N-I | 11 DAY HOT DRY OVEN | 4775 |
| 1b N-O N-I | 12 DAY HOT DRY OVEN | 9564 |
| 1c | 1 DAY HOT DRY OVEN | 1252 |
| 1c | 2 DAY HOT DRY OVEN | 360 |
| 1c | 3 DAY HOT DRY OVEN | 502 |
| 1c | 4 DAY HOT DRY OVEN | 2923 |
| 1c | 5 DAY HOT DRY OVEN | 1193 |
| 1c | 6 DAY HOT DRY OVEN | 3768 |
| 1c | 7 DAY HOT DRY OVEN | 838 |
| 1c | 8 DAY HOT DRY OVEN | 1074 |

TABLE J(iii)-continued

| FILM SAMPLE | | STATIC DECAY (ms) |
|---|---|---|
| 1c | 9 DAY HOT DRY OVEN | 2383 |
| 1c | 10 DAY HOT DRY OVEN | 7495 |
| 1c | 11 DAY HOT DRY OVEN | 3067 |
| 1c | 12 DAY HOT DRY OVEN | 4143 |
| 1b N-I | 1 DAY HOT DRY OVEN | 866 |
| 1b N-I | 2 DAY HOT DRY OVEN | 179 |
| 1b N-I | 3 DAY HOT DRY OVEN | 352 |
| 1b N-I | 4 DAY HOT DRY OVEN | 721 |
| 1b N-I | 5 DAY HOT DRY OVEN | 1149 |
| 1b N-I | 6 DAY HOT DRY OVEN | 1269 |
| 1b N-I | 7 DAY HOT DRY OVEN | 1681 |
| 1b N-I | 8 DAY HOT DRY OVEN | 2630 |
| 1b N-I | 9 DAY HOT DRY OVEN | 8143 |
| 1b N-I | 10 DAY HOT DRY OVEN | 7471 |
| 1b N-I | 11 DAY HOT DRY OVEN | 2670 |
| 1b N-I | 12 DAY HOT DRY OVEN | 14213 |

As can be seen, Film 1c (which was both oriented and irradiated), survived 9 days in the hot oven till it exhibited a high static decay time above 7 seconds. On the other hand, Film 1b N-O N-I (which was both not oriented and not irradiated) and Film 1b N-I (which was oriented but not irradiated) survived 8 days in the hot oven till they exhibited a high static decay time above 8 seconds on day 9.

A sample of Film 2 was tested for surface resistivity which was found to be:

$1.66 \times 10^{12}$ ohms/square.

The remainder of the testing of samples of Film 2 was for static decay time (the oven was at 71° C. without any beaker of water) and the results are reported in Table J(iv) below:

TABLE J(iv)

| CONDITIONING IN HOT DRY OVEN | FOLLOWED BY EQUILIBRATION | STATIC DECAY TIME (MS) |
|---|---|---|
| None | 1 Hour | 6863 |
| | 24 Hours | 7807 |
| 24 hours | 1 Hour | 789 |
| | 24 Hours | 1563 |
| 1 Day | 1 Hour | 631 |
| | 24 Hours | NT* |
| 2 Days | 1 Hour | 515 |
| | 24 Hours | NT* |
| 3 Days | 1 Hour | 551 |
| | 24 Hours | 1110 |
| 4 Days | 1 Hour | 786 |
| | 24 Hours | 1794 |
| 5 Days | 1 Hour | 1584 |
| | 24 Hours | 1746 |
| 6 Days | 1 Hour | 1576 |
| | 24 Hours | 1700 |
| 7 Days | 1 Hour | 1110 |
| | 24 Hours | 3086 |
| 8 Days | 1 Hour | 914 |
| | 24 Hours | 1754 |
| 9 Days | 1 Hour | 649 |
| | 24 Hours | 1343 |
| 10 Days | 1 Hour | 1046 |
| | 24 Hours | 3893 |
| 11 Days | 1 Hour | 639 |
| | 24 Hours | 902 |
| 12 Days | 1 Hour | 941 |
| | 24 Hours | 1443 |

*NT = Not Tested

As can be seen, after 12 days in the hot oven, Film 2 exhibited the most preferred static decay time of less than 2000 ms.

A sample of Film 3 was tested for surface resistivity which was found to be:

$3.76 \times 10^{11}$ ohms/square.

The remainder of the testing of samples of Film 3 was for static decay time (the oven was at 71° C. without any beaker of water) and the results are reported in Table J(v) below:

TABLE J(v)

| CONDITIONING IN HOT DRY OVEN | FOLLOWED BY EQUILIBRATION | STATIC DECAY TIME (MS) |
|---|---|---|
| None | 1 Hour | 3545 |
| | 24 Hours | 2884 |
| 24 Hours | 1 Hour | 4245 |
| | 24 Hours | 4531 |
| 1 Day | 1 Hour | 913 |
| | 24 Hours | NT* |
| 2 Days | 1 Hour | 2440 |
| | 24 Hours | NT* |
| 3 Days | 1 Hour | 967 |
| | 24 Hours | 1618 |
| 4 Days | 1 Hour | 4478 |
| | 24 Hours | 5814 |
| 5 Days | 1 Hour | 4274 |
| | 24 Hours | 8760 |
| 6 Days | 1 Hour | 9800 |
| | 24 Hours | 8576 |
| 7 Days | 1 Hour | 8679 |
| | 24 Hours | 9525 |
| 8 Days | 1 Hour | 12100 |
| | 24 Hours | 8250 |
| 9 Days | 1 Hour | 2650 |
| | 24 Hours | 4412 |
| 10 Days | 1 Hour | 3717 |
| | 24 Hours | 15437 |
| 11 Days | 1 Hour | 6312 |
| | 24 Hours | 8956 |
| 12 Days | 1 Hour | 6084 |
| | 24 Hours | 7374 |

*NT = Not Tested

As can be seen, after 3 days in the hot oven, Film 3 exhibited the most preferred static decay time of less than 2000 ms.

While certain representative embodiments and details have been shown for the purpose of illustration, numerous modifications to the formulations described above can be made without departing from the invention disclosed.

What is claimed is:

1. A 3-layer biaxially oriented, antistatic film comprising a first layer, a second layer, and a third layer, each layer being of about 80% or more by weight of polyolefin and about 20% or less by weight antistatic agent chosen from both (i) fatty acid esters of polyhydroxy alcohols and (ii) at least two polyalkoxylated compounds, and said second layer being disposed between said first layer and said third layer wherein said first and third layers include about 5% by weight or less anti-block additive, and wherein said film will, after 12 days at 160° F. (71° C.), still exhibit antistatic characteristics of a static decay time less than about 2000 milliseconds at low humidity less than about 15% relative humidity.

2. The film of claim 1, which will, after being subjected to a hot (71° C.) oven abuse for at least 3 days, exhibit a decay time of about 2000 ms or less.

3. The oriented antistatic film of claim 1 wherein (i) said fatty ester of polyhydroxy alcohol is polyethoxylated cetyl alcohol, and said two polyalkoxylated compounds are gylcerol monostearate and polyethylene oxide, and wherein said film will, after 12 days at 160° F. (71° C.), still exhibit antistatic characteristics of a static decay time less than about 2000 milliseconds at low humidity less than about 15% relative humidity.

* * * * *